Patented Apr. 23, 1940

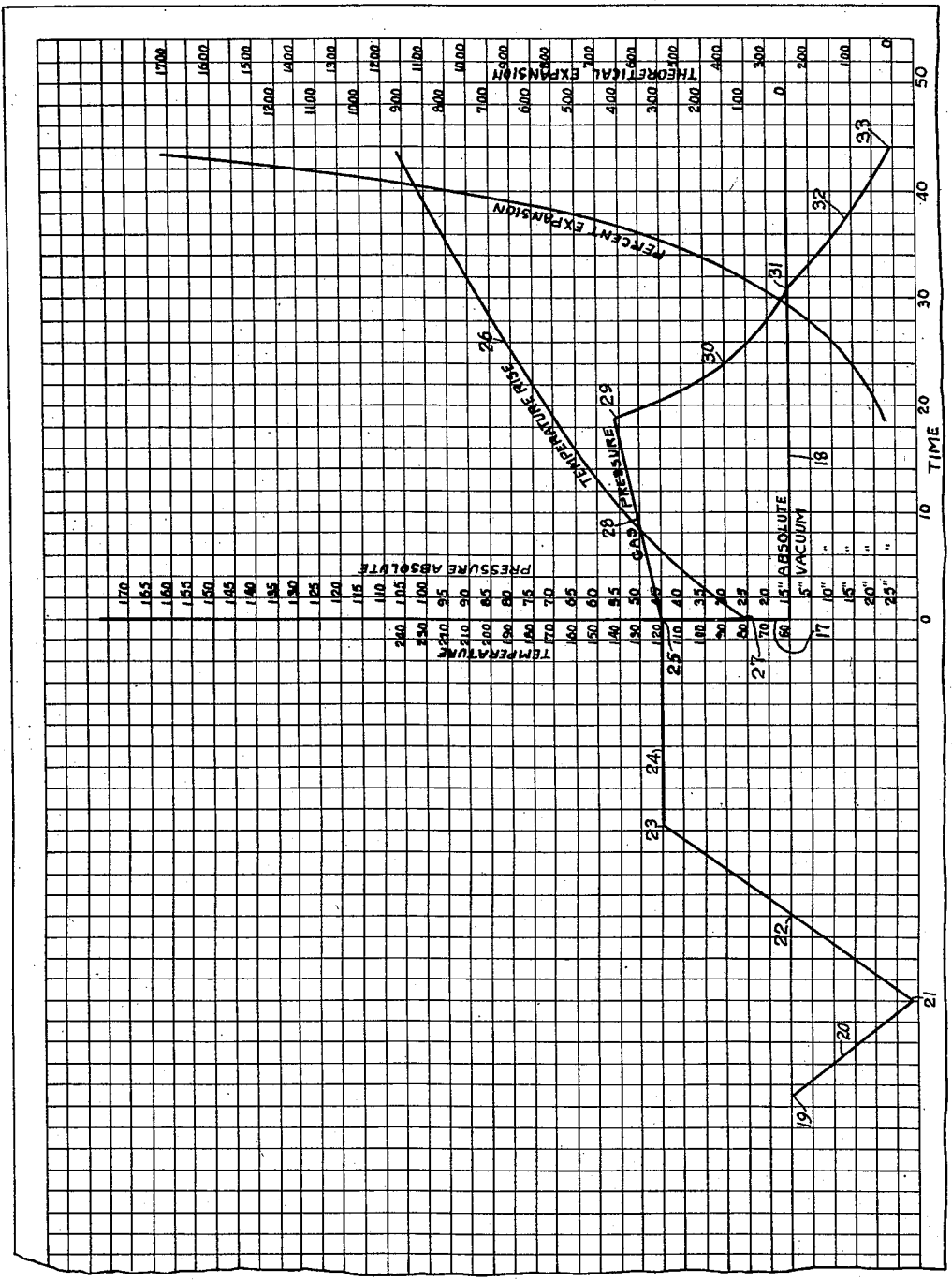

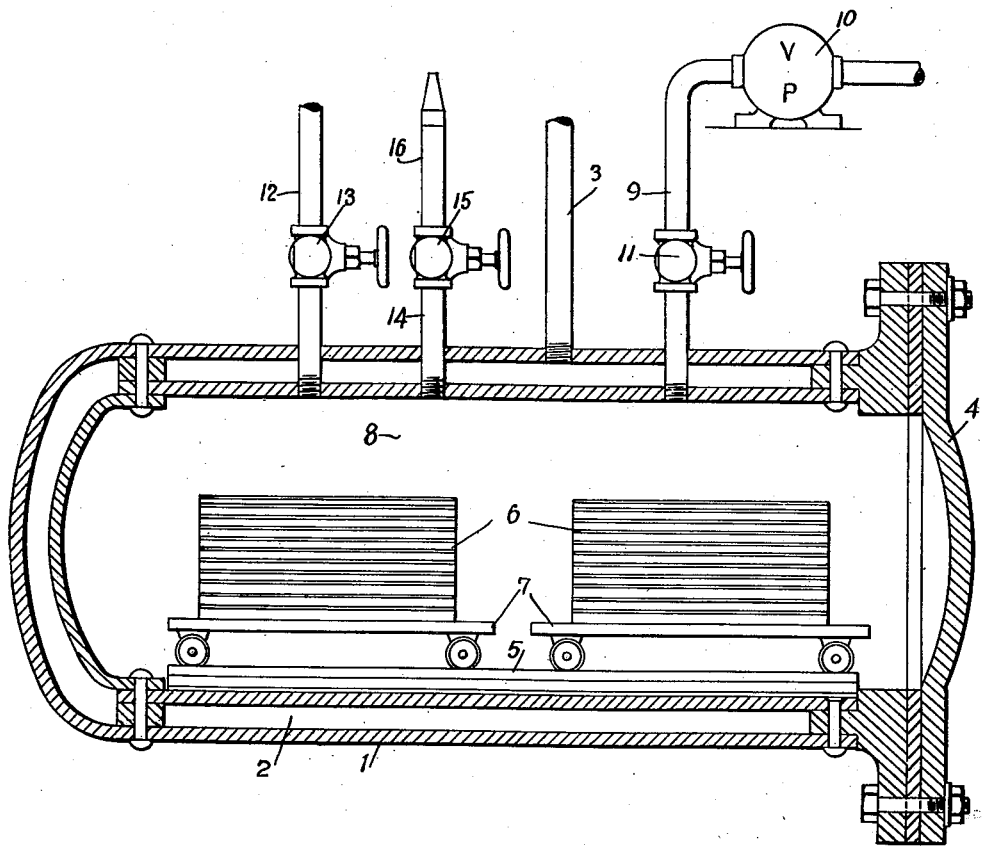

2,197,894

UNITED STATES PATENT OFFICE 2,197,894

PROCESS OF SPONGE RUBBER MANUFACTURE

Henry R. Minor, Dayton, Ohio, assignor to Industrial Process Corporation, Dayton, Ohio, a corporation of New York Original application January 17, 1936, Serial No. 59,625. Divided and this application October 9, 1937, Serial No. 168,205

4 Claims. (Cl. 260—725)

My invention relates to sponge rubber and in particular to a method of causing the sponging of rubber.

It is the object of my invention to control the degree of sponging of rubber and to bring about the maximum sponging of rubber for the amount of stock employed with a minimum use of a blowing gas such as carbon dioxide.

It is a further object to provide in such a process for a substantially complete elimination of the oxidation of rubber, with a corresponding increase in the ageing value of the rubber.

It is a further object to reduce the cost of carbon dioxide gas, which has the peculiar property of being able to penetrate rubber at low pressures, by first evacuating substantially all of the air from the autoclave in which the rubber is being treated prior to the impregnation of the rubber with carbon dioxide gas.

It is a further object to continue the treatment of the rubber after the carbon dioxide gas has been released under its own pressure by applying a vacuum to the autoclave to cause the further expansion of the rubber prior to its vulcanization as the heat is continued or increased, or both, and to so regulate the vacuum as to not bring about a collapse of the rubber. In this manner it is possible to eliminate oxidation of rubber, to effect its sponging at much lower carbon dioxide pressure, to economize on the amount of carbon dioxide gas used, and to bring about an expansion of the rubber materially beyond that which has been possible heretofore. This results in a reduction of the cost of the rubber sponge to such a point that the advantages of carbon dioxide gas cannot only be obtained, but the resulting product is cheaper than sponge rubber production by a chemical process, the latex process or otherwise.

My object is the removal of air from the autoclave; to thereafter impregnate the rubber with carbon dioxide gas; to then increase the pressure of the gas through the application of increased heating; to thereafter release the gas while continuing the temperature and increasing the temperature; and before the temperature has brought about a set to the rubber and after the carbon dioxide has been completely released, to apply a vacuum to further withdraw gases from the rubber to permit its greater expansion, and to bring about the maximum expansion by the application of the vacuum before the rubber finally takes its set due to the heat of vulcanization.

Referring to the drawings:

Figure 1 is a graph showing the successive stages of the process, the pressures, temperatures and vacuums applied.

Figure 2 is a vertical section through an autoclave showing diagrammatically a typical type of apparatus in which this process can be practiced.

Referring to the invention and drawings in detail, the autoclave 1 is provided with a steam jacket 2 to which steam is supplied through the pipe 3. The autoclave is provided with the usual door 4. Within the autoclave is a supporting track or shelf 5 on which are mounted trays 6 that may optionally be placed upon a car 7. If desired, the rubber may be placed in perforated molds such as shown in the application of Henry R. Minor, Ser. No. 59,625, filed January 17, 1936, or the rubber may be laid upon any suitable support upon which it will sponge without being molded. If the support is provided with configurations of various types, the rubber will conform as it is heated to these configurations and the resulting sponge rubber body will take the same shape as the configurations. This autoclave chamber designated 8 is connected to a pipe 9 that in turn is connected to a vacuum pump 10. This line is controlled by a valve 11. A similar pipe 12 controlled by a valve 13 is adapted to supply gas such as carbon dioxide gas to the autoclave while the pipe 14 controlled by the valve 15 is adapted to control the escape of the gas through the nozzle 16.

The apparatus is therefore adapted for the control hereinafter described of the pressures within the autoclave, such as the pressures of air and carbon dioxide in the autoclave, the amount of carbon dioxide therein and its rate of release, and the evacuation of the air. The temperature of the autoclave can likewise be controlled to facilitate the penetration of the gas in the rubber, the expansion of the gas in the rubber, and the subsequent heating of the rubber to cause its further softening to permit of the expansion of the rubber as the gas escapes. Then the heat is continued to bring about the final setting of the rubber in vulcanized state in its expanded condition. This, however, is preceded by the application of suction to the autoclave to create a vacuum therein and cause further expansion of the rubber in its softened state just prior to its final set of vulcanization.

Referring to the graph, the vertical line 17 indicates pressure and temperature. The horizontal line 18 indicates time, that is, the minutes during which the process takes place. 19 indicates the zero point, that is, the point at which the pressure is atmospheric, the temperature is from 60 to 70 degrees F., that is, the usual room temperature, and the time in the cycle is zero time. The first step is indicated by the line 20 that diagrammatically indicates the creation of a vacuum in the autoclave by the vacuum pump 10. This vacuum is preferably carried to 28 inches of mercury. When the air has thus been substantially exhausted, carbon dioxide gas is introduced substantially at the point 21. It continues to flow into the autoclave through the pipe 12 as indicated by the line 22, increasing the pressure it reaches 30 pounds per square inch or 45 pounds absolute as shown on the graph of Figure 1 at the point 23, whereupon it is maintained at that pressure as along the line 24 for a period of from 10 to 40 minutes according to the compound of the rubber and the gauge in thickness of the stock. For instance, a typical compound with a 50 gauge stock will take approximately 25 minutes to be thus impregnated. The time of impregnation also depends upon the pressure of the gas. Obviously, it is desirable to use the minimum of carbon dioxide gas on account of the cost and it is also desirable to keep down the pressure both for reasons of cost and because it keeps the cost of the equipment at a minimum. At the point 25 the gas is cut off and the temperature is further increased, as indicated by the line 26 which starts at 27. As the temperature increases, the pressure curve line 28 of the gas increases due to the application of the heat. This expansion continues to the point 29, at which point the valve 15 is opened and the gas escapes through the nozzle 16. This results in the reduction of the pressure of the gas as indicated by the line 30 until the gas has completely escaped due to its own internal pressure as indicated at the point 31 where the curve 30 crosses the zero line 18. While this has been going on, the heat curve 26 has been rising so that ultimately the temperature reaches approximately 180 to 240 degrees Fahrenheit. Again, this temperature depends upon the conditions of impregnation, compound of the rubber and the gauge of the rubber. Before this heat is sufficient to cause the rubber to take a set due to vulcanization and while the rubber is near its maximum softness and plasticity due to the heat, the vacuum pump 10 is again started to pull a vacuum as indicated by the line 32. About 22 inches of vacuum is accomplished by the time the curve reaches 33. This vacuum must be adjusted as to its rate and amount so as to assist in the evacuation of the gases within the autoclave to cause the further expansion of the rubber to give it a so-called "super-expansion." At the time the rubber comes to its point of super-expansion, as indicated at 33 or thereabouts, the temperature is sufficient to vulcanize the rubber in its super-expanded condition.

The formula I use is the following:

| | |
|---|---:|
| Smoked sheet | 100.00 |
| Zinc oxide | 4.50 |
| Lauric acid | 3.25 |
| Sulfur | 3.25 |
| Mineral oil | 16.00 |
| Whiting | 90.00 |
| El sixty | 1.00 |
| D. P. G. | .50 |
| G. D. Blue | .25 |
| Flectol H | 1.50 |

This application is a division of application Ser. No. 59,625, of Henry R. Minor, filed January 17, 1936.

It will be understood that I desire to comprehend within my invention such modifications as come within the scope of the claims and the invention.

Having thus fully described my invention, what I claim as new and desire to secure by Letters Patent, is:

1. In a process of making sponge rubber, the steps of (a) subjecting a rubber batch to vacuum to remove a substantial portion of the air around and in the rubber; (b) subjecting the rubber to an inert gas pressure to impregnate the rubber; (c) heating the rubber to cause the gas in it to expand and to cause the rubber to soften to permit the expansion; (d) releasing the inert gas progressively as the heat continues to cause the rubber to expand and sponge; (e) continuing the heating of the rubber to cause it to vulcanize in its expanded condition and (f) bringing about maximum expansion by subjecting the rubber to vacuum treatment prior to vulcanization.

2. In a process of making sponge rubber, the steps of (a) placing the rubber batch in an autoclave and subjecting said rubber batch to vacuum to remove a substantial portion of the air around and in the rubber; (b) subjecting the rubber to an inert gas pressure to impregnate the rubber; (c) heating the rubber to cause the gas in it to expand and to cause the rubber to soften to permit the expansion; (d) releasing the inert gas progressively as the heat continues to cause the rubber to expand and sponge; (e) applying a vacuum to the autoclave to evacuate the gases therefrom while the rubber is still soft to superexpand it prior to its final set of vulcanization; and (f) continuing the heating of the rubber to cause it to vulcanize in its expanded condition.

3. In a process of making sponge rubber, the steps of (a) placing a rubber batch in an autoclave; (b) evacuating the air from the autoclave and from the rubber; (c) subjecting the rubber to the pressure of an inert gas in the autoclave to impregnate the rubber; (d) heating the rubber to cause the rubber to soften and the gas to expand in the rubber; (e) continuing the heat and progressively increasing it while simultaneously releasing the inert gas pressure; (f) applying a vacuum to the autoclave to withdraw some of the gases from the rubber to cause it to expand further; and (g) raising the heat to vulcanize the rubber in its super-expanded condition.

4. In a process of making sponge rubber, the steps of (a) placing the rubber in an autoclave and subjecting the rubber to a vacuum of substantially 28 inches of mercury; (b) introducing into the autoclave carbon dioxide gas until a pressure of approximately 30 pounds is reached and continuing that pressure until the rubber is impregnated; (c) applying heat to the rubber to cause it to soften and to effect expansion of the carbon dioxide gas within the rubber; (d) releasing the pressure of carbon dioxide gas on the rubber so as to bring about a sponging of the rubber; (e) applying a vacuum of approximately 22 inches of mercury to further cause an expansion of the rubber; and (f) continuing the heat and increasing it to 180 to 240 degrees Fahrenheit during the gas release and vacuum steps and thereafter bringing about a vulcanization of the rubber in its super-expanded condition.

HENRY R. MINOR.